(12) United States Patent
Pritchard et al.

(10) Patent No.: US 8,191,698 B2
(45) Date of Patent: Jun. 5, 2012

(54) THREE POSITION CONTROL SOLENOID FOR HYDRAULIC ACTIVATION

(75) Inventors: Larry Pritchard, Macomb Township, MI (US); Eric Christopher Sandstrom, Oxford, MI (US); Philip J. Francis, Lapeer, MI (US)

(73) Assignee: Borgwarner Inc., Auburn Hills, MI (US)

( * ) Notice: Subject to any disclaimer, the term of this patent is extended or adjusted under 35 U.S.C. 154(b) by 713 days.

(21) Appl. No.: 12/225,831

(22) PCT Filed: Jun. 27, 2007

(86) PCT No.: PCT/US2007/014911
§ 371 (c)(1),
(2), (4) Date: Feb. 9, 2009

(87) PCT Pub. No.: WO2008/002610
PCT Pub. Date: Jan. 3, 2008

(65) Prior Publication Data
US 2009/0314602 A1    Dec. 24, 2009

Related U.S. Application Data

(60) Provisional application No. 60/816,778, filed on Jun. 27, 2006.

(51) Int. Cl.
*F16D 48/02* (2006.01)
*F16D 29/00* (2006.01)

(52) U.S. Cl. .................................. 192/85.6; 192/85.63
(58) Field of Classification Search .................. 192/85.6
See application file for complete search history.

(56) References Cited

U.S. PATENT DOCUMENTS

| | | | | |
|---|---|---|---|---|
| 3,785,157 | A | * | 1/1974 | Kittle et al. ................ 192/85.63 |
| 4,574,931 | A | | 3/1986 | Kowalczyk |
| 5,217,097 | A | | 6/1993 | Lasoen |
| 5,310,388 | A | | 5/1994 | Okcuoglu et al. |
| 5,934,432 | A | * | 8/1999 | Bates ......................... 192/85.6 |
| 6,273,057 | B1 | | 8/2001 | Schwoerer et al. |
| 6,298,961 | B1 | | 10/2001 | Hageman et al. |
| 6,378,682 | B1 | | 4/2002 | Mohan et al. |
| 6,533,095 | B2 | | 3/2003 | Mohan et al. |
| 6,692,396 | B1 | | 2/2004 | Grogg et al. |
| 6,725,989 | B1 | | 4/2004 | Krisher et al. |
| 2006/0042906 | A1 | | 3/2006 | Ronk et al. |

FOREIGN PATENT DOCUMENTS

GB         2 213 550         8/1989
* cited by examiner

*Primary Examiner* — Rodney Bonck
(74) *Attorney, Agent, or Firm* — Warn Partners, P.C

(57) ABSTRACT

A hydraulic system having a clutch assembly (30) which is hydraulically actuated, a pressure device (32) in fluid communication with the clutch assembly, and a multi-position actuator device (34) in fluid communication with the pressure device and the clutch assembly. The position of the actuator device includes at least a first position in order for the pressure device to fluidly communicate with the clutch assembly, a second position for maintaining fluid pressure in the clutch assembly, and a third position for bleeding the hydraulic system.

17 Claims, 3 Drawing Sheets

THREE POSITION CONTROL SOLENOID FOR HYDRAULIC ACTIVATION

CROSS-REFERENCE TO RELATED APPLICATIONS

This application is a National Stage of International Application No. PCT/US2007/014911, filed Jun. 27, 2007, which claims the benefit of U.S. Provisional Application No. 60/816,778, filed Jun. 27, 2006.

TECHNICAL FIELD

Hydraulic clutches are used in automatic transmissions and transfer cases in order to transfer torque from a vehicle's engine to the axles. These clutches are actuated in a number of ways, one of which is through the use of an electric motor along with a hydraulic fluid circuit.

One problem that can occur when using hydraulics in any type of application is that air gets into the system and affects the hydraulic system performance. Air is a compressible fluid, and can affect how fluid pressure is delivered through the system, and can increase the amount of time it takes for the system to apply a desired amount of pressure. Occasionally, the system needs to be "bled off," where the air in the hydraulic system is purged, so that the hydraulic system maintains the desired level of performance. Prior methods of allowing the system to bleed off include the use of a manually operated bleed valve. The manually operated bleed valve is part of a closed loop hydraulic system that is used to purge air from the system prior to operation.

There are also hydraulic systems with automatically operated bleed valves which purge the air from the hydraulic system. These automatic operating bleed valves typically use check valves in the hydraulic passages where the air will be forced to the top of the valve due to the density differences between the hydraulic fluid and the air. The air then exits the hydraulic system through a check valve, which only allows flow through the valve in one direction. Thus, when the hydraulic system is operated, the pressure in the hydraulic system increases by the use of a first valve, and the air is purged by the check valve during certain operating conditions. However, the use of a check valve requires an additional valve in order to purge the air from the hydraulic fluid.

Therefore, it is desirable to develop a hydraulic system in which the same valve is used to alter the pressure of the hydraulic fluid in the hydraulic system and to purge the air from the hydraulic fluid.

SUMMARY OF THE INVENTION

The present invention is a hydraulic system having a clutch assembly which is hydraulically actuated, a pressure device in fluid communication with the clutch assembly, and a multi-position actuator device in fluid communication with the pressure device and the clutch assembly.

The position of the actuator device includes at least a first position in order for the pressure device to fluidly communicate with the clutch assembly, a second position for maintaining fluid pressure in the clutch assembly, and a third position for bleeding the hydraulic system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
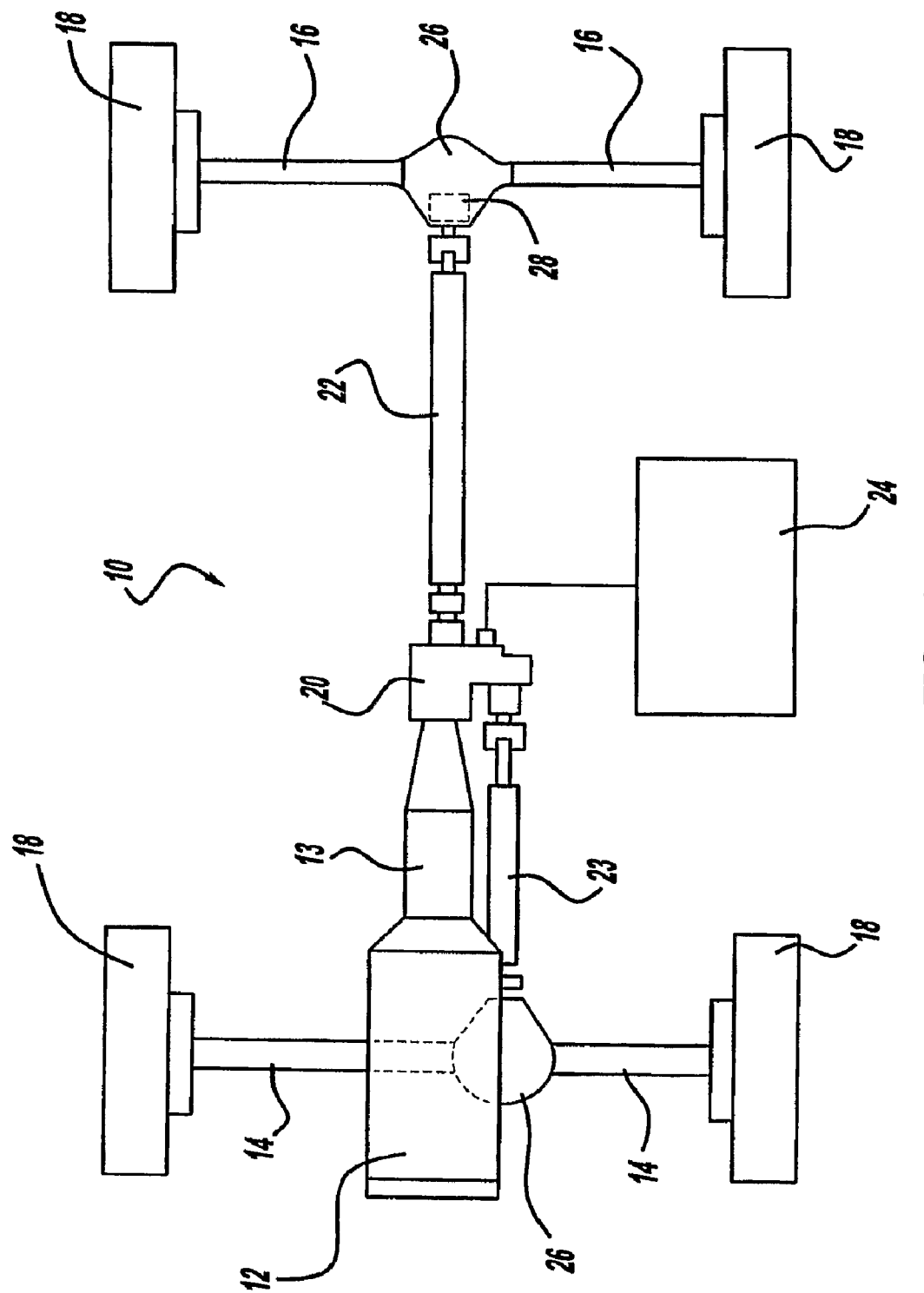
FIG. 1 is an above view of a vehicle driveline having the hydraulic activation system in accordance with the present invention.

Referring to FIG. 1, a vehicle powertrain system incorporating the present invention is generally shown at 10. The vehicle 10 has an engine 12 and transmission 13, which are operably connected to a front axle 14 and a rear axle 16, respectively. Typically, wheels 18 are placed at both ends of the front axle 14 and rear axle 16. Thus, as torque is applied to the axles 14, 16 from the engine 12, the axles 14, 16 rotate which causes the wheels 18 to rotate and allows the vehicle 10 to move.

Typically, a transfer case or coupling 20 is connected to a drive shaft 22 between the engine 12 and rear axle 16. A control unit 24 is used to control the torque applied to the rear axle 16 through the coupling 20. In addition, a differential assembly 26 is placed on the rear axle 16 in order to control the torque transferred through the drive shaft 22 to the rear axle 16. Also connected to the coupling 20 is a secondary drive shaft 23, which delivers power from the coupling 20 to the front axle 14.

The reference to the front axle 14 and the rear axle 16 are for explanation purposes only. It should be appreciated that the rear axle 16 can be directly connected to the engine 12, the differential assembly 26 placed on the front axle 14, or the front axle 14 could have a differential assembly 26, as shown in FIG. 1, in addition to the rear axle 16 having a differential 26.

Figure 2:
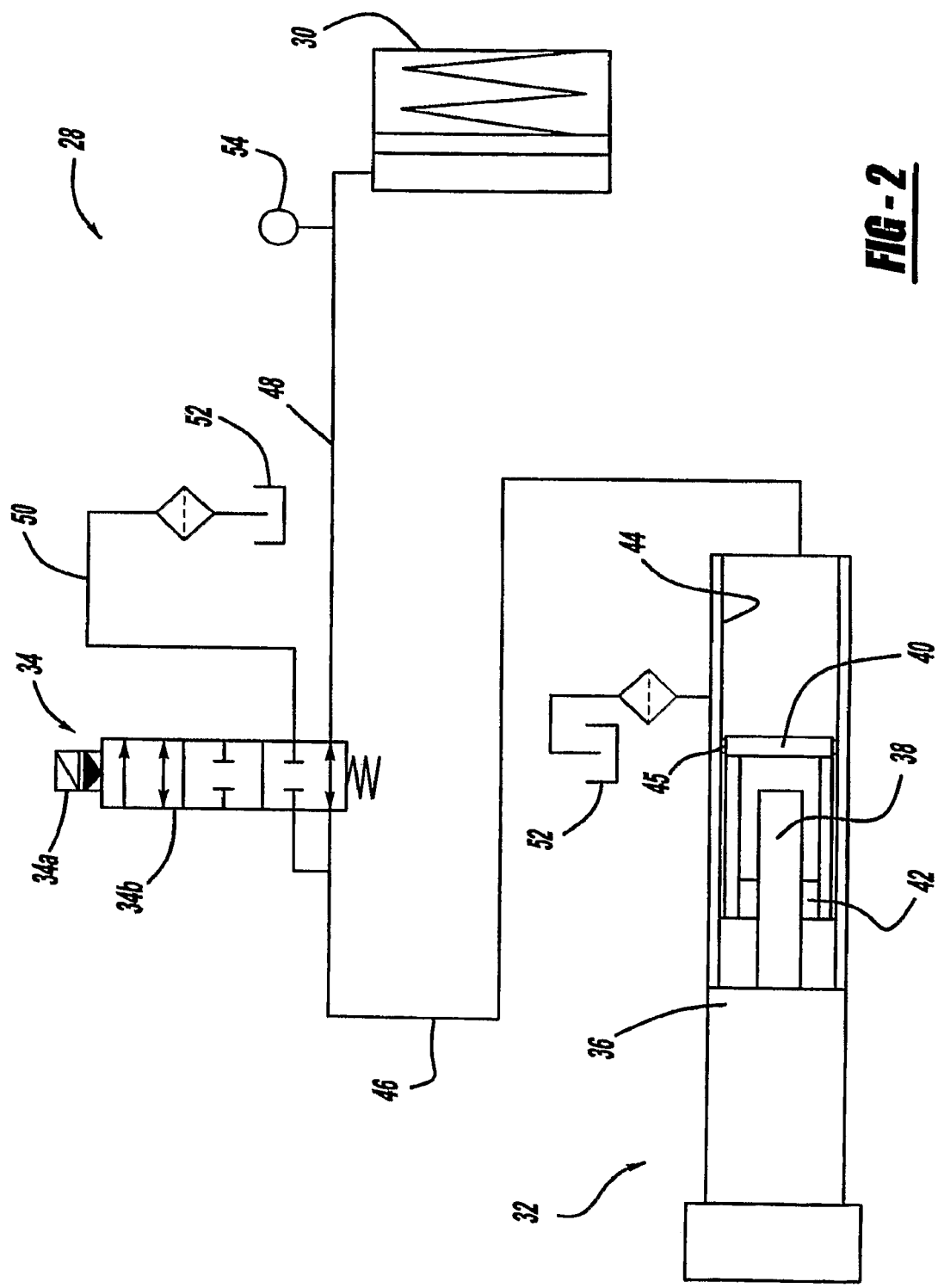
FIG. 2 is a schematic view of the hydraulic activation system in accordance with a preferred embodiment of the present invention with the piston in a retracted position.

In reference to FIGS. 1 and 2, an electrohydraulic clutch assembly is generally shown at 28. Typically, the electrohydraulic clutch assembly 28 is in the differential assembly 26. The electrohydraulic clutch assembly 28 has a clutch assembly, in the form of a clutch pack 30, a pressure device generally indicated at 32, and an actuator device in the form of a solenoid valve 34. Thus, the electrohydraulic clutch assembly 28 is used to transfer the torque from the drive shaft 22 to the wheels 18 on opposite ends of the rear axle 16.

The solenoid valve 34 includes a solenoid portion 34a and a valve portion 34b. The solenoid valve 34 is operably connected to the pressure device 32 and clutch pack 30, so that the position of the valve portion 34b of the solenoid 34 is altered in order to control the direction of fluid flow through the electrohydraulic clutch assembly 28. In a preferred embodiment, the solenoid valve 34 is a three position solenoid valve so that the valve portion 34b in the solenoid valve 34 can be placed in multiple positions, depending upon the vehicle conditions and the desired torque transferred to the wheels 18 and the rear axle 16. In a preferred embodiment the valve portion 34b is a spool valve. However, it is within the scope of the present invention that other types of three way solenoid valves may be utilized without departing from the scope of the present invention.

The pressure device 32 has a driving mechanism 36, a ball screw 38, and a piston 40. Typically the driving mechanism 36 is a bi-directional motor and gear reduction set which allows the driving mechanism 36 to rotate the ball screw 38. The ball screw 38 is operably connected to the piston 40 by the use of a ball nut 42, so that as the ball screw 38 rotates, the ball nut 42 and the piston 40 move in a cylinder 44. Thus, the piston 40 is slidably disposed in the cylinder 44. Surrounding the piston 40 is a seal 45, which slides along the inner surface of the cylinder 44 as the piston 40 moves in the cylinder 44. As the piston 40 slides within the cylinder 44, the hydraulic pressure ultimately transferred to the clutch pack 30 is increased or decreased.

The solenoid valve 34 is in fluid communication between the clutch pack 30 and the pressure device 32. A first hydraulic passage 46 fluidly connects the pressure device 32 and the solenoid valve 34, and a second hydraulic passage 48 fluidly connects the solenoid valve 34 to the clutch pack 30. The valve portion 34b in the solenoid valve 34 is positioned in one of multiple positions in order to either allow or prevent oil flow from the pressure device 32 to the clutch pack 30 through the hydraulic passages 46, 48. The position of the valve portion 34b in the solenoid valve 34 is altered by an electrical current that is transferred to the solenoid portion 34a. Thus, any suitable solenoid valve 34 can be used, so that as the electrical current is applied to the solenoid portion 34a, the magnetic flux provided by the coil of the solenoid portion 34a is increased in order to alter the position of the valve.

When the valve portion 34b of the solenoid valve 34 is in a first position or pressurized position, the hydraulic pressure developed by the pressure device 32 is allowed to communicate with the clutch pack 30. This increase in hydraulic pressure causes the clutch pack 12 to engage the rear axle 16 and increase the amount of torque transferred from the engine 12 to the rear axle 16. The clutch pack 30 engages the rear axle 16 in a range between a disengaged position to a fully engaged position, including a partially engaged position, depending upon the pressure of the hydraulic fluid. Thus, when the clutch pack 30 is disengaged from the rear axle 16, no torque is being transferred to the rear axle 16 from the engine 12. When the clutch pack 30 is in the fully engaged position, a maximum amount of torque is being transferred from the engine 12 to the rear axle 16.

When the valve portion 34b of the solenoid valve 34 is in a second position or hold position, the valve portion 34b is positioned to seal the second hydraulic passage 48 from the first hydraulic passage 46. When the valve portion 34b of the solenoid valve 34 seals the second hydraulic passage 48, the hydraulic pressure in the second hydraulic passage 48 is held constant in order to maintain a constant amount of torque transferred from the engine 12 to the rear axle 16. The amount of torque being held or maintained can be any amount between the clutch pack's 30 range of the disengaged position, and the fully engaged position, and can be dependent upon the amount of torque needed or desired at a given point during operation.

When the valve portion 34b of the solenoid valve 34 is in a third position or bleeding position, the hydraulic fluid passes from the solenoid valve 34 into a third hydraulic passage 50 that is in fluid communication with a sump 52. When the hydraulic fluid is in the third hydraulic passage 50, the air in the hydraulic fluid is released from the electrohydraulic clutch assembly 28. In addition, when the valve portion 34b of the solenoid valve 34 is in the bleeding position, the pressure device 32 reduces the amount of hydraulic pressure transferred to the clutch pack 30. The hydraulic fluid that is placed in the sump 52 is then returned to the first hydraulic passage 46 through the pressure device 32.

Figure 3:
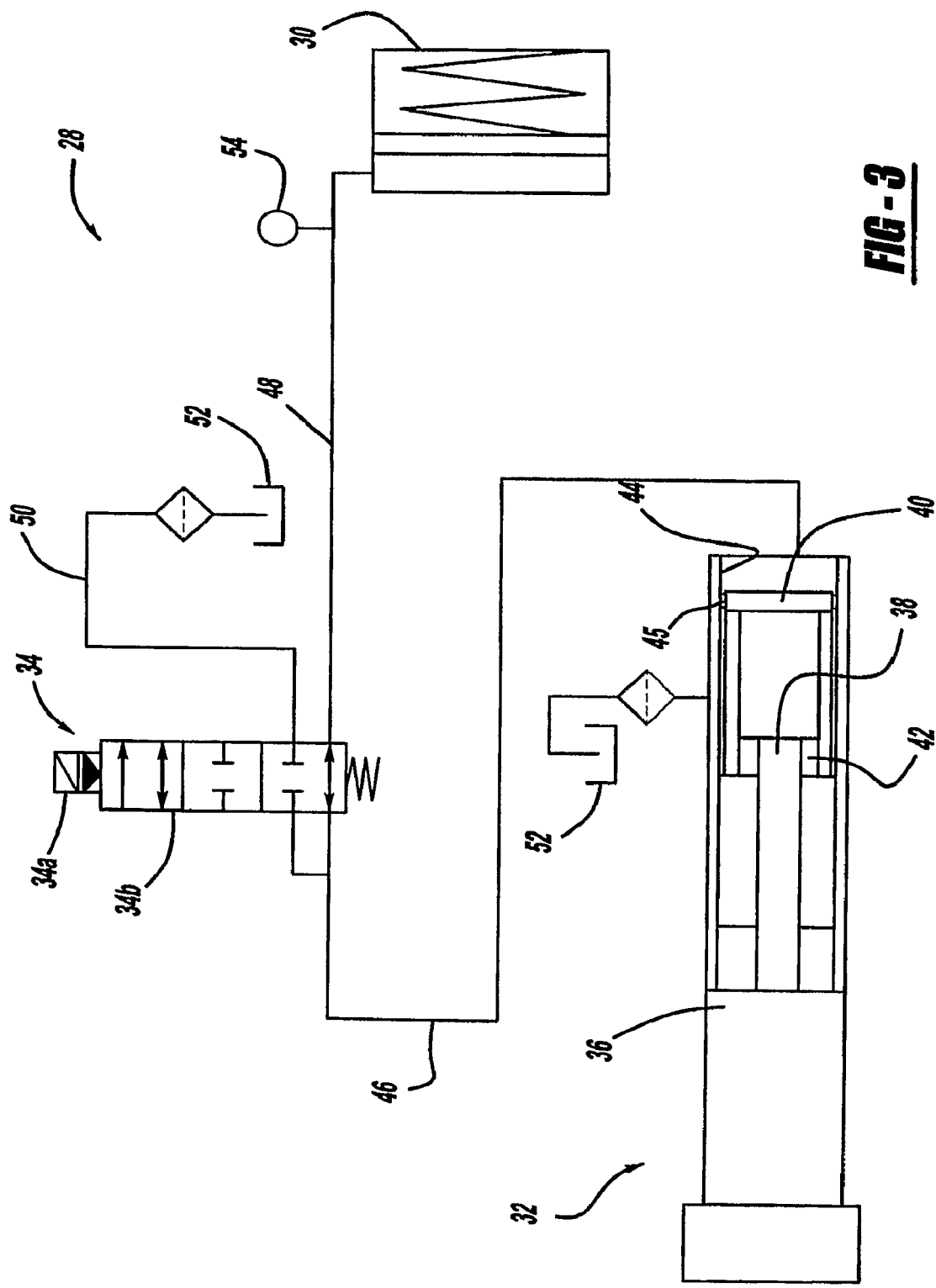
FIG. 3 is a schematic view of the hydraulic activation system in accordance with a preferred embodiment of the present invention with the piston in an extended position.

In operation, the driving mechanism 36 can move the piston 40 is two directions within the cylinder 44. In FIG. 2, the piston 40 is in a retracted position. In this retracted position, fluid is able to flow into the cylinder 44. As the piston 40 is moved to an extended position, shown in FIG. 3, the piston 40 moves past the location where the sump 52 can feed fluid into the cylinder 44, and pressure builds in the cylinder 44, forcing fluid under pressure into the first hydraulic passage 46. The seal 45 prevents fluid from blowing by the piston 40 in the cylinder 44.

Furthermore, a pressure sensor 54 is connected to the second hydraulic passage 48 in order to determine the hydraulic pressure in the second hydraulic passage 48. Typically, the pressure sensor 54 is connected to the control unit 24 so that a signal is transmitted from the pressure sensor 54 to the control until 24 in order for the control unit 24 to determine the hydraulic pressure in the second hydraulic passage 48. The control unit 24 then transmits a signal or an electrical current to the solenoid 34 in order to alter the position of the valve of the solenoid 34. An example of the control unit 24 is, but not limited to, the engine control unit or any other control unit which is connected to the engine control unit.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydraulic system comprising:
a clutch assembly, said clutch assembly being hydraulically actuated;
a pressure device in fluid communication with said clutch assembly; and
a single multi-position actuator device in fluid communication with and connected to both of said pressure device and said clutch assembly, said actuator device having a first position in order for said pressure device to fluidly communicate with said clutch assembly, a second position for maintaining fluid pressure in said clutch assembly, and a third position for purging air from said hydraulic system and reducing pressure in said clutch assembly;
wherein said pressure device has a cylinder with a piston slidably disposed in said cylinder, and said piston slides within said cylinder in order to increase or decrease the fluid pressure transferred to said clutch assembly;
wherein said pressure device has a driving mechanism and a ball screw mechanism driven by said driving mechanism, said ball screw mechanism operably connected to said piston through the use of a ball nut, and as said ball screw mechanism is rotated by said driving mechanism, said ball nut and said piston translate in said cylinder.

2. The hydraulic system of claim 1, said actuator device further comprising a three-position solenoid valve.

3. The hydraulic system of claim 1, wherein said driving mechanism is a bi-directional motor, and said ball screw mechanism includes a shaft upon which a gear is mounted, said gear being part of a gear reduction set connected to said bi-directional motor for driving said ball screw mechanism.

4. The hydraulic system of claim 1, wherein as said actuator device is positioned in said first position, said actuator device is positioned to allow fluid pressure developed by said pressure device to communicate to said clutch assembly.

5. The hydraulic system of claim 1 further comprising at least one hydraulic passage fluidly connecting said pressure device to said clutch assembly through said actuator device.

6. The hydraulic system of claim 5, said at least one hydraulic passage further comprising a first hydraulic passage which fluidly connects said pressure device and said actuator device.

7. The hydraulic system of claim 5, said at least one hydraulic passage further comprising a second hydraulic passage which fluidly connects said actuator device and said clutch assembly, and when said actuator device is positioned in said second position, said actuator device is positioned to seal said second hydraulic passage in order to maintain the fluid pressure transferred to said actuator device.

8. The hydraulic system of claim 5, further comprising as said actuator device is positioned in said third position, said actuator device is positioned to release air in said at least one hydraulic passage to the atmosphere.

9. The hydraulic system of claim 8, said at least one hydraulic passage further comprising a third hydraulic passage, wherein hydraulic fluid passes through said third hydraulic passage to a sump and returns to said pressure device.

10. A hydraulic system comprising:
   a clutch pack, said clutch pack being hydraulically actuated;
   a pressure device in fluid communication with said clutch pack;
   a three position solenoid valve having a valve portion in fluid communication with and connected to both of said pressure device and said clutch pack, wherein the position of said valve portion in said solenoid valve can be altered from a plurality of positions in order for said pressure device to fluidly communicate with said clutch pack, and purge air from said hydraulic system and reducing pressure in said clutch pack; and
   at least one hydraulic passage in fluid communication with said clutch pack, said pressure device, and said three position solenoid valve;
   wherein said pressure device has a cylinder with a piston slidably disposed in said cylinder, and said piston slides within said cylinder in order to increase or decrease the fluid pressure transferred to said clutch assembly;
   wherein said pressure device has a driving mechanism and a ball screw mechanism driven by said driving mechanism, said ball screw mechanism operably connected to said piston through the use of a ball nut, as said ball screw mechanism is rotated by said driving mechanism, said ball nut and said piston translate in said cylinder.

11. The hydraulic system of claim 10, one of said plurality of positions of said valve portion further comprising a pressurized position, such that said valve portion is positioned to allow fluid pressure developed by said pressure device to communicate to said clutch pack.

12. The hydraulic system of claim 10, one of said plurality of positions of said valve portion further comprising a hold position, such that said valve portion is positioned to seal said at least one hydraulic passage, which fluidly connects said solenoid valve and said clutch pack, in order to maintain the fluid pressure transferred to said clutch pack.

13. The hydraulic system of claim 10, one of said plurality of positions of said valve portion further comprising a bleeding position, such that said valve portion is positioned to release air in said at least one hydraulic passage to the atmosphere, and said fluid passes through said at least one hydraulic passage to a sump and returns to said pressure device.

14. A hydraulic system comprising:
   a differential of a vehicle, said differential having at least one hydraulically actuated clutch pack;
   a pressure device in fluid communication with said at least one hydraulically actuated clutch pack, said pressure device located in said differential, and said pressure device further comprising a driving mechanism, a ball screw, and a piston, said piston slidably disposed in a cylinder;
   a three position solenoid valve having a valve portion in fluid communication with and connected to both of said pressure device and said at least one hydraulically actuated clutch pack, wherein the position of said valve portion in said solenoid valve is altered from one or more positions in order for said pressure device to fluidly communicate with said at least one hydraulically actuated clutch pack and to purge air from said hydraulic system and reduce pressure in said at least one hydraulically actuated clutch pack; and
   at least one hydraulic passage in fluid communication with said at least one hydraulically actuated clutch pack, said pressure device, and said three position solenoid valve.

15. The hydraulic system of claim 14, said one or more positions of said valve portion further comprises a pressurized position, such that said valve portion is positioned to allow fluid pressure developed by said pressure device to communicate to said at least one hydraulically actuated clutch pack.

16. The hydraulic system of claim 14, said one or more positions of said valve portion further comprises a hold position, such that said valve portion is positioned to seal said at least one hydraulic passage, which fluidly connects said solenoid valve and said at least one hydraulically actuated clutch pack, in order to maintain the fluid pressure transferred to said at least one hydraulically actuated clutch pack.

17. The hydraulic system of claim 14, said one or more positions of said valve portion further comprises a bleed position, such that said valve portion is positioned to release air in said at least one hydraulic passage to the atmosphere, and fluid passes through said at least one hydraulic passage to a sump and returns to said pressure device.

* * * * *

UNITED STATES PATENT AND TRADEMARK OFFICE
CERTIFICATE OF CORRECTION

| | | |
|---|---|---|
| PATENT NO. | : 8,191,698 B2 | Page 1 of 1 |
| APPLICATION NO. | : 12/225831 | |
| DATED | : June 5, 2012 | |
| INVENTOR(S) | : Larry Pritchard, Eric Christopher Sandstrom and Philip J. Francis | |

It is certified that error appears in the above-identified patent and that said Letters Patent is hereby corrected as shown below:

In the Specification

Column 4,
Line 23 "until" should be -- unit --.

Signed and Sealed this
Ninth Day of April, 2013

Teresa Stanek Rea
*Acting Director of the United States Patent and Trademark Office*